United States Patent
Henningsson et al.

[11] Patent Number: 6,080,688
[45] Date of Patent: Jun. 27, 2000

[54] FLAME RETARDANT, LONG-TIME UV-STABILIZED DRAPEABLE SCREEN

[75] Inventors: Göran Henningsson; Hans Andersson, both of Kinna, Sweden

[73] Assignee: Ludvig Svensson B.V., Netherlands

[21] Appl. No.: 08/870,135

[22] Filed: Jun. 6, 1997

Related U.S. Application Data

[63] Continuation of application No. 08/532,691, filed as application No. PCT/SE94/00278, Mar. 29, 1994.

[30] Foreign Application Priority Data

| Apr. 6, 1993 | [SE] | Sweden | 9301164 |
| Oct. 21, 1993 | [SE] | Sweden | 9303478 |

[51] Int. Cl.$^7$ ................................................. D03D 15/12
[52] U.S. Cl. .......................... 442/185; 428/332; 428/920; 428/921; 47/17
[58] Field of Search .............................. 47/17; 442/185; 428/332, 920, 921

[56] References Cited

U.S. PATENT DOCUMENTS 4,304,746   12/1981   Yamada et al. ........................ 264/103

FOREIGN PATENT DOCUMENTS

| 9179349 | 1/1992 | Australia . |
| 0109951 | 5/1984 | European Pat. Off. . |
| 0146394 | 6/1985 | European Pat. Off. . |
| 254964 | 3/1988 | German Dem. Rep. . |
| 61-181638 | 8/1986 | Japan . |
| 62-055026 | 3/1987 | Japan . |
| 9003434 | 4/1991 | South Africa . |
| WO85/02582 | 6/1985 | WIPO . |

*Primary Examiner*—Elizabeth M. Cole
*Attorney, Agent, or Firm*—Woodbridge & Associates, P.C.; Richard C. Woodbridge; Stuart H. Nissim

[57] ABSTRACT

A flame retardant, drapeable screen having long-time UV-stability useful for shading and energy saving, particularly for greenhouses, comprising flexible strips with a thickness less than 100 um, which form a continuous product by means of a crochet or weave process and a yarn system, where the strips comprising at least a part of the surface of the product, and where at least some of the strips comprise light and/or heat reflecting foil strips, e.g. a low emitting metal foil, preferably an AL-foil.

21 Claims, No Drawings

FLAME RETARDANT, LONG-TIME UV-STABILIZED DRAPEABLE SCREEN

This application is a continuation of application Ser. No. 08/532,691, filed Feb. 5, 1996, now abandoned, which is a 371 of PCT/SE94/00278 filed Mar. 29, 1994.

FIELD OF INVENTION

The present invention refers to a flameretardant, long-time UV-stabilized drapeable screen for shading and energy saving, particularly for greenhouses, and of the kind comprising flexible strips with a thickness less than 100 µm, which by means of a crochet or weave process and a yarn system form a continuous product, where the strips comprise at least a part of the surface of the product, and at which at least some of the strips comprise light and/or heat reflecting foil strips, e.g. a low emitting metal foil, preferably an AL-foil.

BACKGROUND OF THE INVENTION

Screens in accordance with above are used for protection of plants outdoors and inside greenhouses, for adjustment of the in- and outflow of radiant energy, so that the plants are protected against too strong sunlight and against too high or too low temperatures. These screens extend vertically and/or horizontally over very large areas, for instance set-ups with up to 30 000 $m^2$ occur. Such a screen set-up protects large values, since plants may represent a value of about 100 US dollar per square meter. Electrical motors are used to maneuver the screens between active and inactive positions. Such a greenhouse screen is described in EP 0109951 and comprises narrow strips of plastic foil, which strips are held together by textile threads and may consist of a polyester foil being metallized on one of its sides.

Fires can start in screen systems e.g. because of defects in electrical systems, by repairings such as welding, or when a vehicle is driven inside the greenhouse under a screen system. It has been shown that these fires can spread rapidly over large areas via the screens. Such fires may injure people working in the greenhouse and damage the greenhouse in itself. Besides, the vegetation which the screen is meant to protect, is destroyed.

It has also proven hard to modify known plant protection screens, so that they become flameretardant with maintained protection against UV-radiation, during a life expectancy of at least four to five years, without at the same time being very bulky in a drawn aside position.

Flameretardant textiles are used in certain environments where one wants to limit the risk of a small local seat of fire being spread over a larger area.

Flameretardant yarn textiles are complicated to produce, because of the long way of manufacturing. Such known textiles are not heat; reflecting, transmit light to a low extent, are dirt accumulating and water absorbing. Moreover, they do just partly reflect solar radiation. The production cost is high and the width limited. These flameretardant textiles are not usable in connection with greenhouses.

Lately, the technical evolution in the area of plastic film has reached so far, that the flameretardancy is satisfied, but the big problem remains, to overcome and slow down the ageing phenomenon, so the user can be guaranteed a definite life of the plastic film. The difficulties have been, that the addition of halogen, in order to improve the flameretardancy, has taken place at the expense of the UV-stability, which was reduced to such an extent that the material was falling to pieces, either already by production or shortly after being exposed to UVrays.

AU-A-79349/91 describes a flameretardant laminate to be used as insulation layer and diffusion barrier within the building sector. This laminate can at its most be used as roller blind, but it does not meet the demands for a greenhouse screen, since the laminate is waterproof, which means that large pools of water may be formed on the horizontal parts of the greenhouse screen, for which water load the screen system is not dimensioned. Condensation water can be gathered at the underside of the laminate and drip down onto the plants, which then get damaged. Nor does the laminate possess the necessary characteristics, i.e. the quality to be able to be draped, which is required for being able to displace the curtain sideways and park it in the form of a narrow package, which steals a minimum of incoming light.

Polymers with a chemical structure which reduces the combustibility have so far been expensive to produce. For plant protecting screens, there are also demands on providing products having different degrees of light permeability, which put higher demands on the UV-protection.

The demand of certain characteristics, such as the ability of being draped, sideways displaced and easy mounted, in combination with demands on low weight and small volume have also resulted in, that the thickness of the materials being part of the curtain, which to a large extent consists of strips, must be very thin. This demand is very hard to combine with, partly the desired long-time UV-stabilization and the demand on being difficult to ignite, UV stabilization becomes easier to fulfill the thicker the plastic film of the laminate is (the filter effect). In the demand on being difficult to ignite, the amount of material influences the self-extinguishing ability. A thin material contains a small amount of fire protection means.

THE TECHNICAL PROBLEM

The purpose of the present invention is to provide a difficult to ignite, long-time UV-stabilized drapeable screen, which is weather-proof and does not present the above described disadvantages, and which can be produced within reasonable costs.

THE SOLUTION

For this purpose the screens according to the invention are characterized in, that they are formed of a halogen or phosphorus containing plastic film, that at least some of the strips are laminated with said foil strips, and that the yarn system at least partly consists of an non-combustible material, e.g. modacrylic or polyester or a mixture of these.

The screen can be divided into longitudinal zones of alternating flammable material and flameretardant material.

DESCRIPTION OF EMBODIMENT

The invention comprises a drapeable screen for plant protecting purposes, which screen consists of flexible strips, that by means of a crochet or weave process and a yarn system forms a continuous product.

At least some of the strips consist of light and/or heat reflecting foil strips, e.g. a low emitting metal foil, preferably an AL-foil.

The foil strips are supported by plastic film strips consisting of a halogen or phosphorus containing polymer, such as PVC, PVDC, PCTFE, PVF, PVDF, FEP, PTFE, E/TFE or PETP. Some of the strips can be transparent, which are considerably more exposed to UV-light than those with AL-foil or similarly laminated strips. These transparent strips are produced in a long-time UV-stabilized polymer with built-in halogen content.

At least some of the plastic film strips are laminated with aluminium foil strips. The plastic film strips should have a thickness less than 100 μm, preferably 20–30 μm and the metal foil should have a thickness less than 30 μm, preferably 9 μm.

The plastic film and the AL-foil can be joined to each other through laminating, e.g. by means of a polyurethane based glue having an addition of phosphated ester. Alternatively the laminate can be produced through co-extruding, extrude laminating or the like.

When the foil screen comprises a large number of flexible plastic film strips, which form a continuous crocheted product, where the plastic film strips constitute at least a part of the surface of the product, the laminate strips can be arranged to extend at least in the longitudinal direction of the product with yarn on at least one of the flat sides of the strips.

If the product is woven the laminate strips can be arranged to extend at least in the warp direction of the product, with fillings of yarn in the warp and/or weft direction of the product.

In both these cases the yarn system can, at least partly, consist of a material difficult to ignite, e.g. modacrylic or polyester or a mixture of these. Alternatively, the yarn can at least partly consist of a material being difficult to ignite, e.g. glass fibre or phosphorous or halogen bearing polymers. The yarn closeness amounts to 1–10 threads per centimeter. This means that liquid drops landing on the curtain are absorbed by the yarn system.

All strips in the screen do not need to consist of material being difficult to ignite, but one or more strips of material being difficult to ignite can be alternatingly placed next to one or more strips of flammable material. Practical tests have very unexpectedly shown, that the chosen plastic materials yield such amounts of fire obstructing gases at a fire, that even near by parts of the fabric are protected. Further, the foil curtain can be alternatingly divided into longitudinal zones of flammable material and material difficult to ignite.

The strips in the screen can for instance include white light-reflecting strips, transparent strips and strips with metal powder in the polymer.

The strips can also be produced of a laminate, comprising partly a non-woven film produced of a material difficult to ignite, and partly a light and/or heat reflecting foil, e.g. a low emitting metal foil, preferably an AL-foil.

The invention is not limited to the above described embodiments, instead more variants are conceivable within the scope of following claims.

What is claimed is:

1. A difficult to ignite, UV-stabilized drapeable screen for shading and energy saving comprising;
    a plurality of flexible strips comprised of a halogen or phosphorous containing polymer film, having a thickness of less than 100 μm; and,
    a yarn system for coupling said flexible strips into a continuous product by means of crocheting or weaving,
    wherein said yarn system is formed of a flame retardant material, said flame retardant material being selected from the group consisting of polymers containing halogens, polymers containing phosphorous, glass fibers, and combinations thereof.

2. The screen of claim 1 wherein one or more of said flexible strips are light transparent.

3. The screen of claim 1 wherein each of one or more of said flexible strips is laminated with a foil strip.

4. The screen of claim 3 wherein said foil strip is light reflecting, heat reflecting or both light and heat reflecting.

5. The screen of claim 3 wherein said foil strip is comprised of a metal foil.

6. The screen of claim 5 wherein said foil strip comprises aluminum foil.

7. The screen of claim 1 wherein said flexible strips have UV-stability and flame-retardancy.

8. The screen of claim 1 wherein the polymers comprising said yarn system are flame retardant and are selected from the group consisting of polyester, modacrylic and mixtures thereof.

9. The screen of claim 1 wherein said flexible strips have a thickness between about 20 μm to about 30 μm.

10. The screen of claim 3 wherein said foil strip has a thickness of less than 30 μm.

11. The screen of claim 10 wherein said foil strip has a thickness of about 9 μm.

12. The screen of claim 10 wherein said flexible strips have a thickness between about 20 μm to about 30 μm.

13. The screen of claim 12 wherein said foil strip has a thickness of about 9 μm.

14. The screen of claim 3 wherein said foil strip is attached to said each of one or more flexible strips laminated with said foil strip with a flame-retardant adhesive.

15. The screen of claim 1 wherein said continuous product is produced by means of a warp knit technique and wherein said flexible strips are arranged to extend at least in the weft direction of the continuous product.

16. The screen of claim 1 wherein said continuous product is produced by means of a warp knit technique and wherein said flexible strips are arranged to extend at least in the warp direction of said continuous product.

17. The screen of claim 1 further comprising one or more strips comprised of a flammable material.

18. The screen of claim 17 wherein said flexible strips are alternately placed next to said one or more strips of flammable material.

19. The screen of claim 17 wherein said continuous product is divided into longitudinal zones of strips of flammable material and in zones of flame-retardant materials.

20. The screen of claim 1 wherein said flexible strips are essentially free of alkaline UV stabilizers.

21. A difficult to ignite, UV-stabilized drapeable screen for shading and energy saving comprising;
    a plurality of flexible strips comprised of a polymeric film, having a thickness of less than 100 μm; and,
    a yarn system for coupling said flexible strips into a continuous product by means of crocheting or weaving,
    wherein said polymeric film is selected from the group consisting of PVC, PVDC, PCTFE, PVF, PVDF, FEP, E/TFE, PETP and mixtures thereof, and
    wherein said yarn system is formed of a flame retardant material, said flame retardant material being selected from the group consisting of polymers containing halogens, polymers containing phosphorous, glass fibers, and combinations thereof.

* * * * *